(12) United States Patent
Kataria et al.

(10) Patent No.: US 11,062,033 B2
(45) Date of Patent: Jul. 13, 2021

(54) INDEPENDENT INTEGRITY VERIFICATION OF SECURITY POLICY DATA IN APPLICATIONS ON A CLIENT

(71) Applicant: VMWARE, INC., Palo Alto, CA (US)

(72) Inventors: Alok Nemchand Kataria, Pune (IN); Sachin Shinde, Pune (IN); Achindra Bhatnagar, Hyderabad (IN)

(73) Assignee: VMware, Inc., Palo Alto, CA (US)

( * ) Notice: Subject to any disclaimer, the term of this patent is extended or adjusted under 35 U.S.C. 154(b) by 99 days.

(21) Appl. No.: 16/409,902

(22) Filed: May 13, 2019

(65) Prior Publication Data

US 2020/0272742 A1 Aug. 27, 2020

(30) Foreign Application Priority Data

Feb. 26, 2019 (IN) .............................. 201941007410

(51) Int. Cl.
*G06F 21/57* (2013.01)
*G06F 21/71* (2013.01)
*G06F 21/64* (2013.01)

(52) U.S. Cl.
CPC ............ *G06F 21/577* (2013.01); *G06F 21/64* (2013.01); *G06F 21/71* (2013.01)

(58) Field of Classification Search
CPC .... G06F 21/00–88; G06F 21/62; G06F 21/54; G06F 17/00–40; G06F 21/577; G06F 21/71; G06F 21/64; H04L 63/10; H04L 9/00–38; H04L 21/00–04; H04L 61/00–203
See application file for complete search history.

(56) References Cited

U.S. PATENT DOCUMENTS

| 7,418,457 B2* | 8/2008 | Kaler ....................... H04L 45/34 |
| 2016/0266890 A1* | 9/2016 | Aleksandrov ............. G06F 8/65 |
| 2016/0269441 A1* | 9/2016 | Savage ............... H04L 63/1433 |
| 2019/0007426 A1* | 1/2019 | Bergstrom .............. H04L 51/12 |

* cited by examiner

*Primary Examiner* — Joseph P Hirl
*Assistant Examiner* — Rodney E. Haven (57) ABSTRACT

The disclosure herein describes verifying integrity of security policies on a client device. Policy data sets associated with security applications of virtual machines on the client device are received from a server and stored on the client device. An integrity verifier on the client device receives verified checksums from the server, wherein the verified checksums are associated with the policy data sets. Client-side checksums are generated by the integrity verifier based on the stored policy data sets. Upon generating the client-side checksums, the integrity verifier compares the verified checksums to the generated client-side checksums. Based on the comparison indicating that a verified checksum and a client-side checksum differ, the integrity verifier generates a checksum failure indicator, wherein the client device is configured to take corrective measures to restore integrity of the virtual machines based on the checksum failure indicator.

20 Claims, 5 Drawing Sheets

INDEPENDENT INTEGRITY VERIFICATION OF SECURITY POLICY DATA IN APPLICATIONS ON A CLIENT

RELATED APPLICATIONS

Benefit is claimed under 35 U.S.C. 119(a)-(d) to Foreign Application Serial No. 201941007410 filed in India entitled "INDEPENDENT INTEGRITY VERIFICATION OF SECURITY POLICY DATA IN APPLICATIONS ON A CLIENT", on Feb. 26, 2019, by VMware, Inc., which is herein incorporated in its entirety by reference for all purposes.

BACKGROUND

When computing devices and associated software applications are connected to the Internet or other large communication networks, they may be exposed to malicious attacks that intend to obtain or change data or otherwise alter the operation of the computing devices. Many computing devices include security software configured to prevent such attacks from gaining access to the devices. The methods used by security software to secure the device on which it is installed are defined by security policy data that is stored and accessed by the security software.

Some malicious attacks on computing devices target the security software and, specifically, the security policy data. If an attacker can make changes to the security policy data that effectively changes how the security software performs security operations, the attacker can open holes in the security software through which attacks may commence.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for verifying integrity of security policies on a client device is described. Policy data sets associated with security applications of virtual machines on the client device are received from a server and stored on the client device. An integrity verifier on the client device receives verified checksums from the server, wherein the verified checksums are associated with the policy data sets of the security applications. Client-side checksums are generated by the integrity verifier based on the stored policy data sets, wherein the client-side checksums correspond to the verified checksums. The integrity verifier compares the verified checksums to the generated client-side checksums. Based on the comparison indicating that a verified checksum and a client-side checksum differ, the integrity verifier generates a checksum failure indicator, wherein the client device is configured to take corrective measures to restore integrity of the virtual machines based on the checksum failure indicator.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Aspects of the disclosure provide a computerized method and system for verifying integrity of security policies on a client device. A server that stores policy data sets is configured to send the policy data sets to virtual machines on the client device for use by the security applications of those virtual machines. The client device includes an integrity verifier component that further receives verified checksums associated with the sent policy data sets from the server. The integrity verifier generates client-side checksums that are based on and correspond to the policy data sets stored with the security applications. Upon generating the client-side checksums, the integrity verifier compares the verified checksums to the generated client-side checksums. When the comparison indicates that a verified checksum and a corresponding client-side checksum differ, the integrity verifier generates a checksum failure indicator. The checksum failure indicator may be shared with other components of the client device and the server, such that corrective measures are taken to restore integrity of the virtual machines based on the checksum failure indicator.

The disclosure operates in an unconventional way at least by securely maintaining policy data sets and associated checksums that are verified as correct on the server while providing an integrity verifier component on the same client device as the virtual machines, or other associated applications, that is configured to efficiently verify and validate the state of the policy data sets on the client device with relatively high frequency. The use of the integrity verifier on the client device serves to prevent the need for the server and client device to frequently communicate to verify and validate the policy data sets that are being used by the applications of the client device, which would be relatively expensive with respect to both bandwidth usage and time taken.

Further, the efficiency and security of the client device and the associated virtual machines and applications are improved by the described operations of the integrity verifier. The integrity verifier and associated system components are flexible and scalable, such that they are configured to handle multiple types of policy data sets of different formats and to perform policy data set verification operations on multiple virtual machines at variable intervals. Additionally, the integrity verifier is configured to seamlessly handle asynchronous, live policy updates, such that downtime from policy updates is reduced or entirely eliminated, and currently active policy data sets are consistently verified throughout the update process, regardless of version differences.

While some virtualized examples are described with reference to VMs for clarity of description, the disclosure is operable with other forms of virtual computing instances (VCIs). A VCI may be a VM, a container, and/or any other type of virtualized computing instance. Further, while some examples are described with reference to virtualization, the disclosure is operable in non-virtualized environments.

Figure 1:
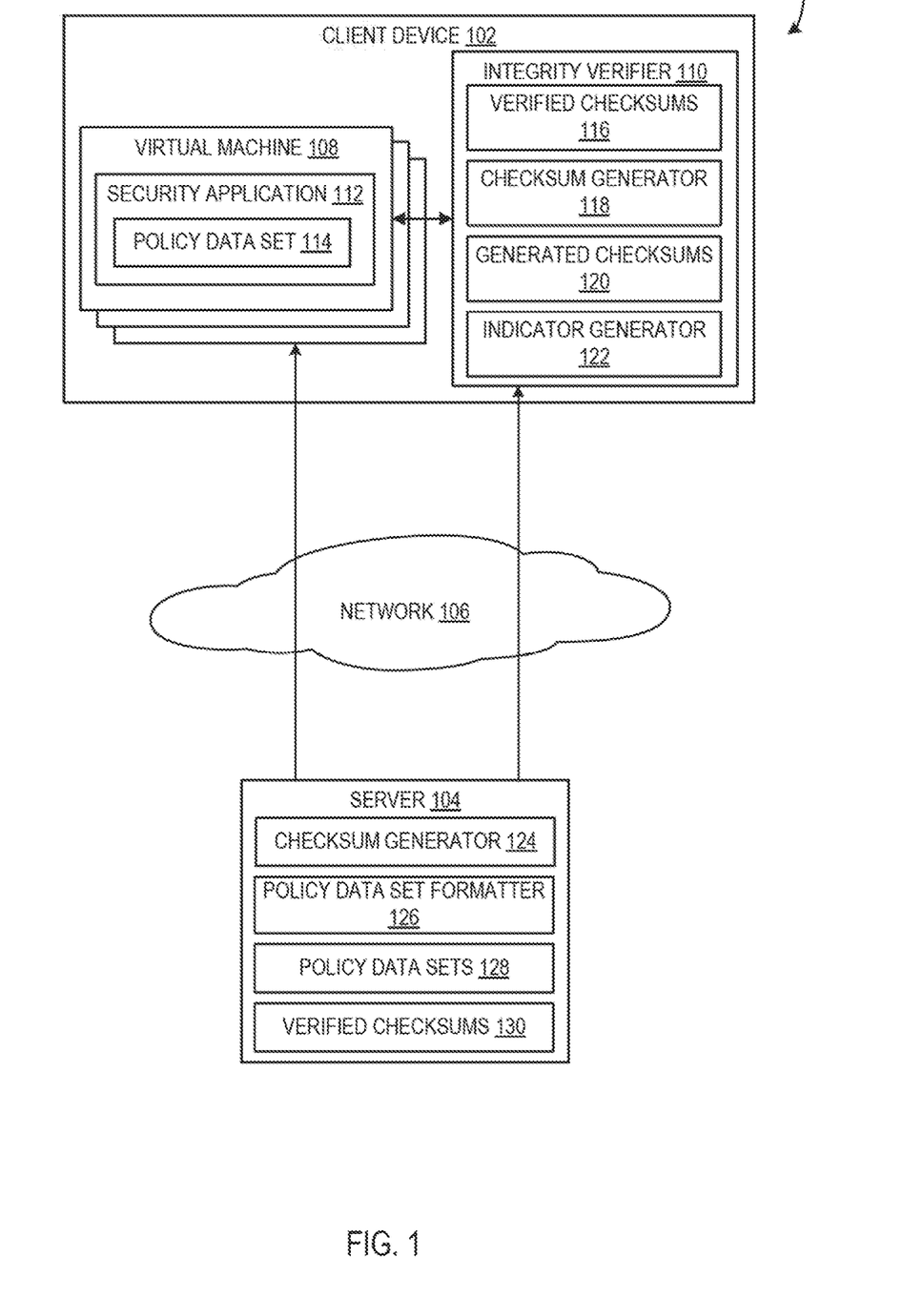
FIG. 1 is an exemplary block diagram illustrating a system configured for verifying the integrity of policy data on a client device according to an example.

FIG. 1 is an exemplary block diagram illustrating a system 100 configured for verifying the integrity of policy data (e.g., policy data set 114) on a client device 102 according to an example. The system 100 includes a client device 102 and a server 104 that are configured to communicate over a network 106.

The client device 102 includes a plurality of virtual machines 108 and an integrity verifier 110. The virtual machines 108 each include a security application 112, which is configured to enforce security policy for the associated virtual machine based on the policy data set 114. Each virtual machine 108 may be configured to include virtualized hardware, firmware, and/or software for performing computer operations as would be understood by a person of ordinary skill in the art. The security application 112 may be configured to monitor the operations of the associated virtual machine 108 as well as monitor the input and/or output of the virtual machine 108. Further, the security application 112 may perform operations or otherwise take actions based on the results of monitoring the virtual machine 108. The methods of monitoring and/or actions taken by the security application 112 may be based on one or more security policies defined in the policy data set 114 associated with the security application 112. For instance, actions taken by the security application include blocking incoming data to the virtual machine 108, preventing changes to portions of the memory of the virtual machine 108, generating notifications to users of the virtual machine 108 or other components of the system 100, etc. The security policies of the policy data set 114 may be configured to trigger based on identifying incoming and/or outgoing data of the virtual machine 108 from defined sources, data that includes defined content or data patterns, data that include instructions to perform defined action actions in the virtual machine 108, other system events such as interrupts or exceptions, etc. It should be understood that the security applications 112 may be configured according to any security application principles and the associated policy data sets 114 may be configured for compatibility with the security applications 112 as would be understood by a person of ordinary skill in the art.

Further, the virtual machines 108 and/or the associated security applications 112 may be configured to receive policy data sets 114 from the server 104 over the network 106 as described herein.

The integrity verifier 110 of the client device 102 includes software, firmware, and/or hardware configured to perform the integrity verification operations described herein. The integrity verifier 110 includes verified checksums 116, a checksum generator 118 and associated generated checksums 120, and an indicator generator 122. Further, the integrity verifier 110 is configured to communicate and/or interact with the virtual machines 108 of the client device 102 and with the server 104 via the network 106 as described herein. In some examples, the integrity verifier 110 executes and/or makes use of memory in a protection domain or secure hardware enclave (e.g., protected using separate permissions settings) separate from the virtual machines 108.

In some examples, a secure hardware enclave (also known as a hardware-assisted trusted execution environment (TEE)) is a region of computer system memory, allocated via a special set of central processing unit (CPU) instruction codes, where user-world code can run in a manner that is isolated from other processes running in other memory regions (including those running at higher privilege levels). Thus, secure hardware enclaves enable secure and confidential computation. Examples of existing technologies that facilitate the creation and use of secure hardware enclaves include SGX (Software Guard Extensions) for x86-based CPUs and TrustZone for ARM-based CPUs.

In other examples, the integrity verifier 110 is not executed and/or does not make use of memory in a protection domain or secure hardware enclave.

The verified checksums 116 of the integrity verifier 110 are received from the server 104 and stored in association with the integrity verifier 110. Each verified checksum 116 is generated by the server 104 as described below and based on an associated policy data set 114 of the virtual machines 108. It should be understood that the verified checksums 116 may be formatted based on any known checksum generation techniques known in the art (e.g., hashing algorithms, cryptographic hashing algorithms such as Secure Hash Algorithm 256 (SHA-256), cyclic redundancy check (CRC) algorithms, or a message digest unique to each policy data set). In some examples, each verified checksum 16 is a data value of a defined length that is almost-unique and generated based on applying an algorithm to the associated policy data set 114. Further, verified checksums 116 may be substantially smaller than the associated policy data sets 114, such that comparison of checksums is substantially faster and/or more efficient than direct comparison of the associated policy data sets.

The checksum generator 118 is configured to apply a checksum generation algorithm, such as a cryptographic hashing algorithm or the like, to policy data sets 114 of the virtual machines 108 to generate the generated checksums 120 on the client side. In some examples, the generator 118 periodically generates multiple generated checksums 120 in batches for a plurality of policy data sets 114. Alternatively, or additionally, the checksum generator 118 is configured to generate generated checksums 120 separately for each policy data set 114 and based on periodic intervals specific to each policy data set 114. The periodic intervals for generating the generated checksums 120 may be regular lengths of time defined by the integrity verifier 110. Further, the periodic intervals for generating the generated checksums 120 may be adjusted to be shorter or longer by random or pseudorandom lengths of time, such that any predictability of a pattern of generating checksums 120 is reduced or eliminated.

In some examples, the checksum generator 118 is configured to generate checksums 120 based on the entire associated policy data set. Alternatively, the checksum generator 118 is configured to generate checksums 120 based on a subset of the data of the policy data set. For instance, if a policy data set is very large and generating a checksum from the entire data set requires substantial time or processing resources, the checksum generator 118 generates a checksum 120 from a defined subset or portion of the data set. For instance, if a policy data set is 10 GB in size, the server 104 divides it into ten 1 GB pieces and generate checksums for each piece. All ten checksums may be sent to the integrity verifier 110 and, when the integrity verifier 110 generates a client-side checksum 120 for comparison, it may randomly or pseudo-randomly choose one of the ten checksums to use in the comparison. This may dilute the security to some extent but reduce processing costs for checksum generation by the integrity verifier 110.

In some examples, the generated checksums 120 are generated by the checksum generator 118 in the same way the verified checksums 116 are generated at the server 104 by the checksum generator 124. In some examples, integrity verifier 110 and checksum generator 118 are configured to be compatible with the server 104 and associated checksum generator 124. Alternatively, or additionally, the checksum generator 118 is dynamically configurable with multiple checksum generation algorithms or methods. In that case, the server 104 provides an indication of the checksum generation method used by the checksum generator 124 to generate the verified checksums 116 when the server 104 sends the verified checksums 116 to the integrity verifier 110.

The indicator generator 122 of the integrity verifier 110 is configured to generate indicators based on the comparison of generated client-side checksums 120 to the corresponding verified checksums 116. If corresponding checksums match, it indicates that the associated policy data set 114 remains intact, such that the integrity of the policy data set 114 is verified. If corresponding checksums do not match, it may indicate that the policy data set 114 has been modified as a result of an attack or otherwise improperly changed. The integrity verifier 110 may be configured to compare the generated checksums 120 to corresponding verified checksums 116 upon generation of the checksums 120 by the checksum generator 118. The results of the comparison are provided to the indicator generator 122, which may be triggered to generate one or more indicators as described herein.

When the results indicate that a set of corresponding checksums 120 and 116 do not match, the indicator generator 122 may be triggered to generate a checksum failure indicator. The checksum failure indicator may include information associated with the policy data set 114, security application 112, and/or virtual machine 108 with which the non-matching checksums are associated. For instance, the checksum failure indicator includes an identifier of the policy data set 114, security application 112, and/or the virtual machine 108. The checksum failure indicator may further include context data, such as a date and/or timestamp. In some examples, the checksum failure indicator indicates a portion or portions of the corresponding checksums that failed to match.

The indicator generator 122 and/or the integrity verifier 110 may further be configured to send the checksum failure indicator to other components of the system 100 and/or to a user or users of the system 100. In some examples, the checksum failure indicator is sent to the server 104, client device 102, and/or the virtual machine 108 associated with the non-matching checksums. The component that receives the checksum failure indicator may be configured to perform corrective measures or otherwise take action. For instance, the server 104 or client device 102 is configured to shut down, suspend, quarantine, or otherwise stop the operation of the virtual machine 108 that is associated with the non-matching checksums. Alternatively, or additionally, the server 104 resends the policy data set 114 to the virtual machine 108 to restore the integrity of the security application 112. Such a resending may happen after the virtual machine 108 has been stopped and any other issues caused or damage done by an associated attack has been identified and handled. The indicator generator 122, in some examples, includes instructions on the checksum failure indicator for corrective measures that the virtual machine 108, client device 102, or server 104 may take to correct any issue with the associated policy data set 114.

Further, in some examples, the indicator generator 122 is configured to generate other indicators based on the comparison of corresponding checksums. For instance, when the comparison results in matching corresponding checksums, the indicator generator 122 generates a checksum success indicator that may then be shared to the other components of the system 100. The receiving components may be configured to take action based on received checksum success indicators (e.g., record the indicator in a log).

In alternative examples, the client device 102 includes guest applications or other types of client-side applications instead of or in addition to the virtual machines 108. The integrity verifier 110 may be configured to perform the described integrity verification processes for each separate application of the client device 102 separately and/or in batches. Further, a client device 102 with multiple integrity verifiers 110 and/or other component combinations or structures may be used without departing from the description herein.

The network 106 includes one or more computer networks that are configured to enable network communications between the server 104 and the client device 102. It should be understood that communications between components of the system 100 may be performed using network connections on the network 106 as would be understood by a person of ordinary skill in the art of computer networks and communications. The network 106 may include a plurality of networks (e.g., private intranets, public networks such as the Internet) and/or network types (e.g., wired networks, wireless networks such as Wi-Fi networks or cellular networks). The network 106 may include any hardware, firmware, and/or software arranged in hierarchies or structures that enable the components of the system 100 to communicate as described without departing from the description herein.

The server 104 includes a checksum generator 124, a policy data set formatter 126, policy data sets 128, and verified checksums 130. The server 104 may include one or more computing devices configured to communicate with the client device 102 and/or other computing devices via the network 106. Further, the server 104 includes software, firmware, and/or hardware configured to perform the operations described herein, including generating checksums based on policy data sets, formatting policy data sets, and performing corrective measures upon receiving checksum failure indicators.

The checksum generator 124 is configured to generate verified checksums 130 based on the policy data sets 128. The checksum generator 124 may be configured to generate checksums 130 based on known checksum generation techniques. It should be understood that the checksum generator 124 generates checksums in substantially the same manner as the checksum generator 118 of the integrity verifier 110 described above, in some examples. The server 104 and checksum generator 124 may be configured to communicate with the integrity verifier 110 to ensure that the checksum generation methods used by the checksum generator 124 and the checksum generator 118 are substantially the same or otherwise compatible.

The policy data set formatter 126 is configured to format or otherwise transform policy data sets 128 prior to generating verified checksums 130 and sending the transformed policy data sets 128 to the virtual machines 108. In some examples, the policy data set formatter 126 is configured to "flatten" the policy data sets 128 as would be understood by a person of ordinary skill in the art. This may include converting data structures that use pointers, such as linked lists or trees, into flattened or serialized files or data blobs in which the pointers have been resolved to local addresses within the files or blobs. Flattening the policy data set may be used to ensure that the checksum generation algorithms of the checksum generator 124 and the checksum generator 118 can be applied consistently throughout the described processes, at least because the same byte-ordering has been used during the flattening. It should be understood that, in alternative examples, the policy data set formatter 126 is configured to format or otherwise transform the policy data sets 128 according to other processes that result in a consistent data format that is compatible with generation without departing from the description herein.

The server 104 is configured to send the policy data sets 128 to the virtual machines 108 and associated security applications 112 after they are formatted by the policy data set formatter 126. The policy data sets 128 are then stored on or otherwise associated with the security applications 112 and virtual machines 108 as policy data sets 114. The checksum generator 124 also uses the formatted policy data sets 128 to generate the verified checksums 130, which are then shared with the integrity verifier 110 and stored as verified checksums 116.

In some examples, the server 104 and client device 102 are configured to perform policy data set update processes while the virtual machines 108 continue to run. The server 104 may send updated policy data sets to the virtual machines 108 and updated checksums to the integrity verifier 110. The integrity verifier 110 may be configured to handle the version change by comparing generated checksums 120 to both the previous version and the new version of verified checksums 116 while the policy data set update processes are being performed. This process is described in greater detail below in FIG. 3.

Further, in alternative examples, the integrity verifier 110 is located on a separate device from the virtual machines 108, so long as the virtual machines 108 expose access to the policy data sets 114 to the integrity verifier 110 and the integrity verifier 110 is able to receive verified checksums from the server 104.

It should be understood that, while the description herein primarily deals with verifying the integrity of policy data sets, other types of data sets that may be target for malicious attacks, such as configuration data and network settings data, may also be periodically verified in addition to or as an alternative to the verification of the policy data sets without departing from the description herein.

Figure 2:
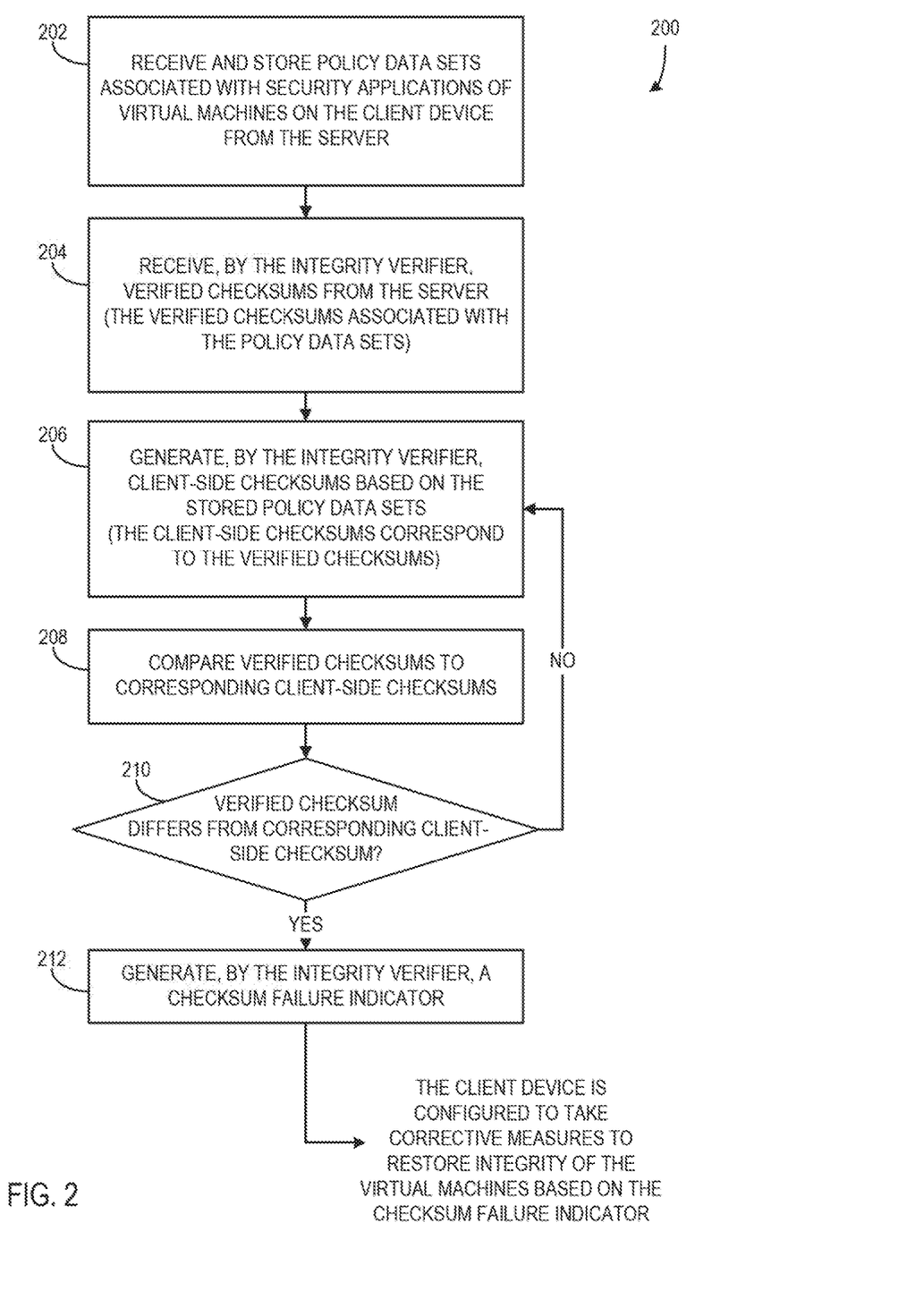
FIG. 2 is an exemplary flow chart illustrating a method of verifying the integrity of policy data on a client device based on checksums according to an example.

FIG. 2 is an exemplary flow chart illustrating a method 200 of verifying the integrity of policy data on a client device 102 based on checksums 116 and 120 and according to an example. It should be understood that the method 200 may be implemented and/or performed by a system such as system 100 configured as described above in FIG. 1. At 202, the policy data sets (e.g., policy data sets 114) associated with the security applications (e.g., security applications 112) of the virtual machines (e.g., virtual machines 108) on the client device (e.g., client device 102) are received from the server (e.g., server 104) and stored. As described above, the received policy data sets may be flattened or otherwise formatted to ensure compatibility with checksum generation techniques used by the integrity verifier. In some examples, storing a policy data set includes updating settings or other configuration data of the associated security application to use the newly received and stored policy data set (e.g., a pointer in the security application is set to point at the location of the new stored policy data set). Further, the security application and/or the associated virtual machine may expose the address of the stored policy data set or otherwise provide access to the integrity verifier to enable the integrity verifier to read the policy data set.

At 204, the integrity verifier (e.g., integrity verifier 110) receives verified checksums (e.g., verified checksums 116) from the server, wherein the verified checksums are associated with the policy data sets of the security applications. The verified checksums may be stored in memory of the integrity verifier or in a location that is otherwise separate and secure from the operations of the virtual machines of the client device. Other data that can be used to verify the integrity of the policy data sets may be received with the verified checksums, such as a file size of the associated flattened or formatted policy data set. Such a file size data value may be used during the comparison described below to further enhance the detection of changes to the policy data sets.

At 206, the integrity verifier generates client-side checksums (e.g., generated checksums 120) based on the stored policy data sets, wherein the client-side checksums correspond to the verified checksums. The integrity verifier then compares the verified checksums to the corresponding client-side checksums at 208.

In some examples, the integrity verifier accesses the stored policy data sets via application programing interfaces (APIs) of the virtual machines and/or security applications that expose or otherwise provide access to the policy data sets. The integrity verifier may generate the client-side checksums based on reading the policy data sets from the virtual machines or, alternatively, the integrity verifier may read and cache the policy data sets and then generate the client-side checksums based on the cached copies of the policy data sets. In some examples, the integrity verifier is configured to generate client-side checksums from policy data sets of multiple virtual machines in batches.

Further, as described above, the reading of the policy data sets from the virtual machines and the associated generation of the client-side checksums may be performed repeatedly based on a periodic interval or intervals. The periodic intervals for generating client-side checksums may be of a consistent length or they may be adjusted for each iteration, such that the client-side checksums are generated at random or pseudorandom times.

At 210, if a verified checksum differs from the corresponding client-side checksum, the process proceeds to 212. Alternatively, if the verified checksums do not differ from the corresponding client-side checksums, the process returns to 206. Any difference between corresponding checksums indicates that the policy data set stored on the associated virtual machine has changed from the policy data set that is on the server (e.g., server 104). Such a detected difference may indicate that there is an issue with the policy data set on the virtual machine, such as a successful attack or infiltration by malicious software into the policy data set and potentially other portions of the virtual machine.

At 212, after a difference between corresponding checksums is detected, the integrity verifier generates a checksum failure indicator, wherein the client device is configured to take corrective measures to restore the integrity of the virtual machines based on the checksum failure indicator. As described above corrective measures may include disabling the virtual machine associated with the differing checksums and/or installing a corrected policy data set from the server to restore the integrity of the virtual machine. Alternatively, or additionally, the client device and/or server may be configured to make changes to other virtual machines and/or the integrity verifier based the generation of a checksum failure indicator. For instance, upon detecting a checksum difference, the integrity verifier is configured to immediately generate client-side checksums for all the virtual machines and perform a comparison in an effort to determine if any other virtual machines have also been compromised or corrupted. In another example, the integrity verifier is configured to reduce the length of intervals between generating client-side checksums for all or a portion of the virtual machines for a defined period of time (e.g., shorten the interval to 1 minute for the next 30 minutes) to increase the likelihood of quickly identifying any other virtual machines that may have issues in that time.

Figure 3:
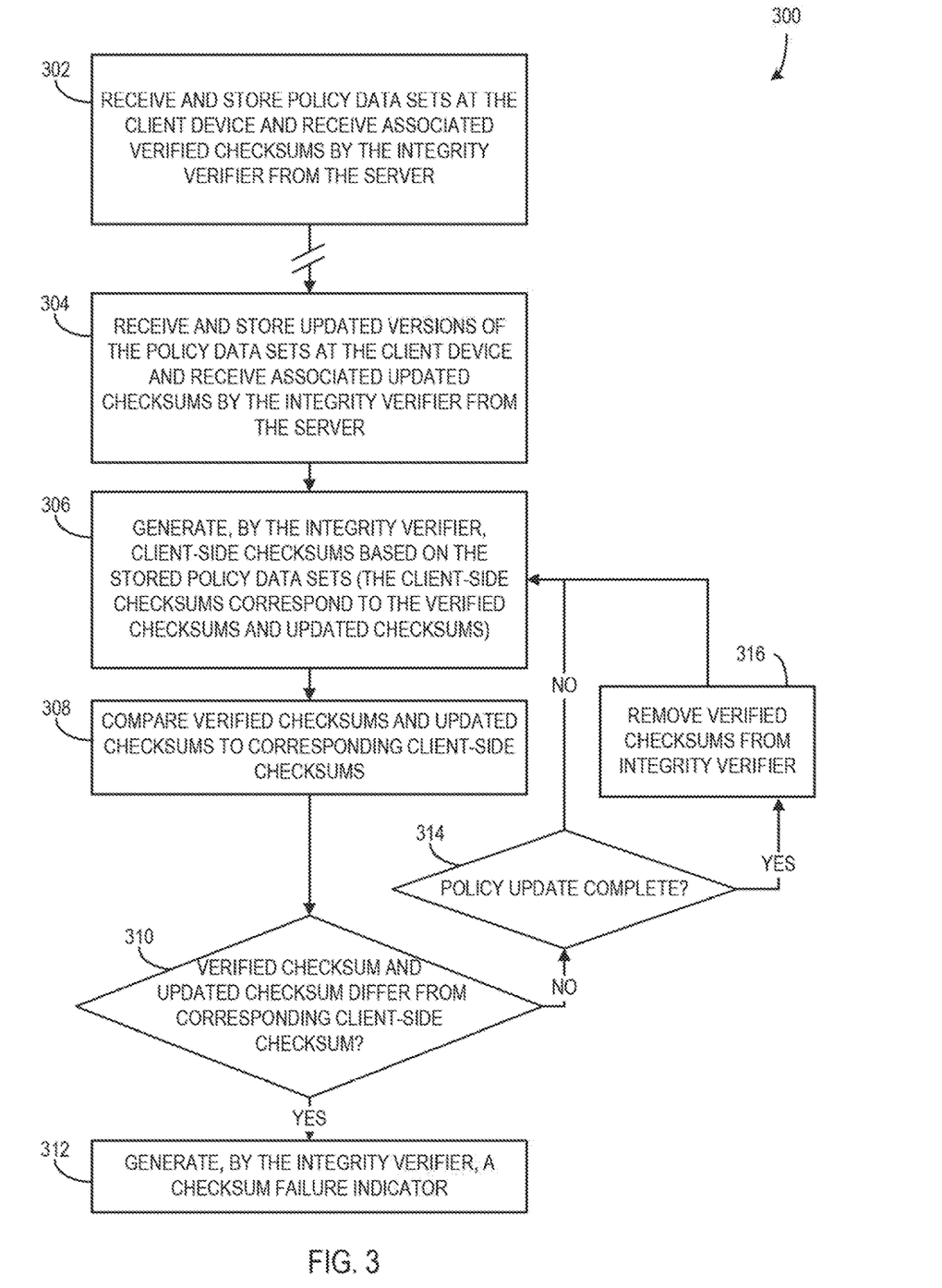
FIG. 3 is an exemplary flow chart illustrating a method of verifying the integrity of policy data on a client device during a policy update process according to an example.

FIG. 3 is an exemplary flow chart illustrating a method 300 of verifying the integrity of policy data (e.g., policy data sets 114) on a client device (e.g., client device 102) during a policy update process according to an example. It should be understood that the method 300 may be implemented and/or performed by a system such as system 100 configured as described above in FIG. 1. At 302, the policy data sets are received and stored at the client device and the associated verified checksums are received by the integrity verifier from the server. It should be understood that the processes performed at 302 may be substantially the same as the processes described above with respect to 202-204 of FIG. 2. Further, the processes described in FIG. 2 can occur after 302 and prior to 304, in some examples.

At 304, updated versions of the policy data sets are received and stored at the client device and associated updated checksums are received by the integrity verifier from the server. It should be understood that the policy update process may require additional processing by the client device, virtual machines, and/or associated security applications beyond receiving and storing the updated versions of policy data sets. As a result, the update process may include a period of time in which some security applications are configured to use the updated versions of policy data sets and other security applications are still configured to use the previous versions of policy data sets as the policy data sets are asynchronously updated. The integrity verifier is configured to continue to verify the integrity of both versions of the policy data sets of the security applications throughout the policy update process. In some examples, the integrity verifier maintains the previous versions of the verified checksums and stores the updated checksums as well.

At 306, the integrity verifier generates client-side checksums based on the stored policy data sets, as described above with respect to 206 of FIG. 2. The integrity verifier may access the stored policy data set that is currently being used by each security application, such that it may be either a previous version of the policy data set or an updated version of the policy data set. The format of the policy data sets remains the same across versions, so the generation of the client-side checksums is the same process, regardless of the version of the policy data sets being used.

At 308, the integrity verifier compares the previous versions of verified checksums and the updated checksums to the corresponding client-side checksums. If, at 310, either the verified checksum or the updated checksum does not differ from a corresponding client-side checksum (e.g., the client-side checksum matches at least one of the corresponding verified checksum and updated checksum), the process proceeds to 314. Alternatively, if the verified checksum and the updated checksum both differ from the corresponding client-side checksum, the process proceeds to 312. If the policy data set associated with the checksums being compared has not been compromised, the client-side checksum will match at least one of either the previous version of the verified checksum or the newly updated checksum because the policy data set is either the previous version policy data set or the newly updated policy data set.

At 312, the integrity verifier generates a checksum failure indicator. It should be understood that the checksum failure indicator may be generated in the same manner as described above with respect to 212 of FIG. 2. Further, components of the system may be configured to take corrective actions as described above. In some examples, a checksum failure indicator during the policy update process results in the associated virtual machine and/or security application to be prioritized for a policy data set update if it has not been updated yet. Alternatively, or additionally, if it has already been updated, the virtual machine and/or security application may be flagged to indicate that the update should be performed again.

At 314, if the policy update is complete, the process proceeds to 316.

Alternatively, if the policy update is not yet complete, the process returns to 306. In some examples, the integrity verifier is configured to determine when the policy update is complete (e.g., all of the policy data sets that were scheduled to be updated during the policy update process have been updated). For instance, the integrity verifier tracks when client-side checksums match the most up-to-date versions of verified checksums. When all client-side checksums have matched the most up-to-date versions of corresponding verified checksums, the integrity verifier may determine that the policy update process is complete. Alternatively, or additionally, the integrity verifier may be notified by the client device, server, or other component of the system that the policy update process is complete (e.g., each virtual machine is configured to check in with the client device to confirm when the associated policy data sets are updated and the client device may notify the integrity verifier when all of the virtual machines have checked in).

At 316, when the policy update is complete, the integrity verifier removes the previous versions of the verified checksums from memory. Because the policy update is complete, all of the policy data sets have been updated to the most recent versions. There is no need to retain the previous versions of the verified checksums in the integrity verifier, and so they are deleted or otherwise removed. After removal, the process returns to 306. The integrity verifier may continue to generate client-side checksums periodically to verify the integrity of the policy data sets as described herein.

Figure 4:
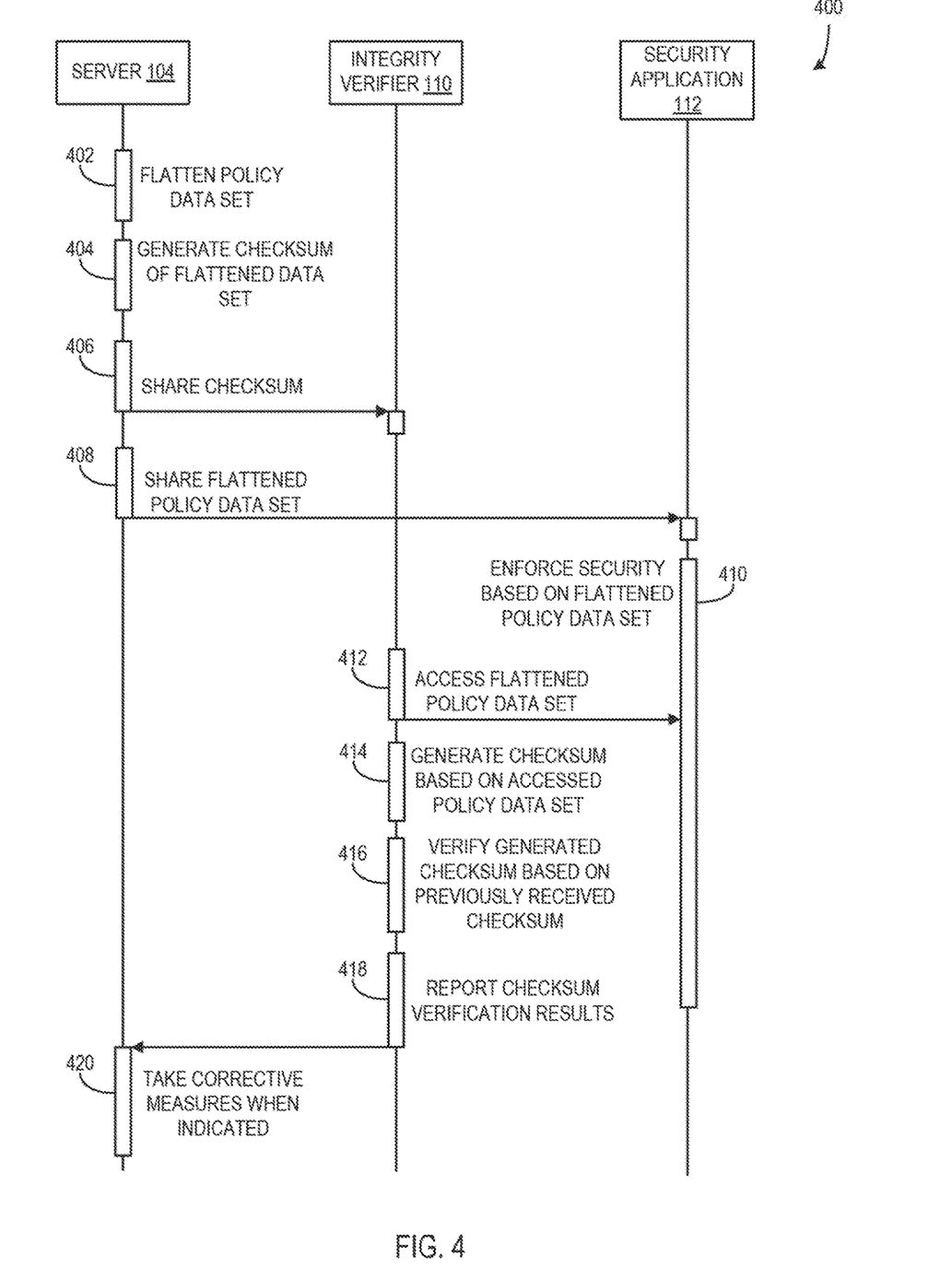
FIG. 4 is an exemplary sequence diagram illustrating operations of a server, integrity verifier, and a security application of during verification of policy data associated with the client application according to an example.

FIG. 4 is an exemplary sequence diagram 400 illustrating operations of a server 104, integrity verifier 110, and a security application 112 of during verification of policy data associated with the client application according to an example. It should be understood that the operations of sequence diagram 400 may be implemented and/or performed by a system such as system 100 configured as described above in FIG. 1. At 402, the server 104 flattens the policy data set. As described above, flattening the policy data sets may be used as a method of providing policy data sets that are formatted consistently and that are compatible with checksum generation methods.

At 404, the server 104 generates a checksum of the flattened data set and, at 406, shares the generated checksum with the integrity verifier 110. The checksum shared from the server 104 to the integrity verifier 110 is considered a verified checksum (e.g., verified checksum 116) because the server 104 generated it based on a policy data set that is accurate.

At 408, the server 104 shares the flattened policy data set with the security application 12. The flattened policy data set is stored and used by the security application 112 as described herein (e.g., policy data set 114 of security application 112 in FIG. 1). It should be understood that, while the diagram 400 shows the checksum being shared to the integrity verifier 110 prior to the flattened policy data set being shared to the security application 112, in other examples, those operations are performed in a different order or substantially simultaneously. However, if the policy data set is shared to the security application 112 prior to the checksum being shared to the integrity verifier 110, the integrity verifier 110 may perform a checksum comparison as described herein based on an older verified checksum version, resulting in a false checksum failure. In some examples, the integrity verifier 110 and/or other components of the system are configured to handle this occurrence without triggering a checksum failure event. For instance, the integrity verifier 110 accesses a datetime and/or version data value associated with when the security application 112 received the current policy data set. If that datetime or version data value do not match corresponding values of the verified checksums of the integrity verifier 110, the integrity verifier 110 may refrain from performing checksum comparisons until it receives updated verified checksums from the server 104.

At 410, after receiving the flattened policy data set, the security application 112 enforces security based on the policies of the flattened policy data set. Enforcing security may include monitoring activities of the associated virtual machine and/or client device, monitoring input to and/or output from the associated virtual machine and/or client device, and the like, as described herein.

While the security application 112 performs security enforcement operations based on the policy data set, the integrity verifier 110 accesses the flattened policy data set from the security application 112 at 412. It should be understood that this process may be triggered based on a periodic interval as described above. At 414, the integrity verifier 110 generates a checksum based on the accessed policy data set and, at 416, the integrity verifier 110 verifies the generated checksum based on the previously received checksum from the server 104.

At 418, the integrity verifier 110 reports the checksum verification results to the server 104. Such results may include a checksum failure indicator as described herein if the generated checksum is found to not match the received checksum. Alternatively, or additionally, a successful verification may also be reported to the server 104 for logging purposes, etc. Further, the verification results may be reported to other components, such as the security application 112, in addition to or instead of the server 104 in alternative examples.

At 420, the server 104 takes corrective measures when indicated by the checksum verification results. As described above, when the integrity verifier 110 provides a checksum failure indicator to the server 104, the server 104 may be configured to shut down, quarantine, or otherwise prevent the virtual machine and/or client device associated with the security application from continuing to operate in order to correct the issue and restore the integrity of the security application.

Additional Example Scenarios

Aspects of the disclosure enable various additional scenarios, such as next described.

In an example, a system is configured as described herein, including a server and a client device connected via a network. The client device executes a plurality of virtual machines that each include security applications. The security applications include policy data sets that inform and define the security operations of those applications as described herein. The client device also executes an integrity verifier application that is in communication with the virtual machines.

The server stores policy data sets for each of the security applications.

Upon receiving a new version of a policy data set from a security policy source, the server initiates a policy update process. The server flattens the new policy data set and sends it to the a first virtual machine and second virtual machine on the client device because the first and second virtual machines include security applications that are compatible with the policy data set to be updated. Further, the server generates a checksum from the flattened policy data set and sends the checksum to the integrity verifier.

Upon receipt of the new checksum, the integrity verifier stores the new checksum as a verified checksum associated with the verified checksum of the previous version of the policy data set. At substantially the same time, the first and second virtual machines begin the process of updating to the new version of the policy data set received from the server.

During the update process, a checksum comparison is triggered in the integrity verifier based on the expiration of a defined interval that has been modified by a random value. At this point, the first virtual machine has completed the update to the new version of the policy data set, but the second virtual machine is still in the midst of the update process and the old version of the policy data set is currently active. The integrity verifier accesses the current policy data set of the first virtual machine and generates a client-side checksum based thereon. Then, the integrity verifier compares the generated client-side checksum to the verified checksum of the previous version of the policy data set. Because the first virtual machine is using the new version of the policy data set that includes changes from the old version of the policy data set, the comparison indicates that the client-side checksum and the verified checksum do not match. The integrity verifier then identifies that the verified checksum of the new version is also stored. The integrity verifier compares the client-side checksum to the verified checksum of the new version and finds that they match, thereby validating that the current policy data set in use by the security application of the first virtual machine is secure.

Then, the integrity verifier accesses the current policy data set of the second virtual machine and generates a client-side checksum based thereon. The integrity verifier compares this client-side checksum to the verified checksum of the older version of the policy data set and finds that they match. The integrity verifier has verified that the current policy data set of the second virtual machine is secure. Additionally, the integrity verifier determines that the second virtual machine is using an older policy data set version and will likely be updated in the near future. As a result, the integrity verifier adjusts the checksum comparison interval for the second virtual machine to reduce it, such that the integrity verifier may more quickly detect when the policy update process of the second virtual machine is completed.

The next checksum comparison is triggered after the second virtual machine has completed the update process.

The integrity verifier determines that a generated client-side checksum matches the verified checksum of the new version of the policy data set, verifying that the policy data set of the second virtual machine is secure and that the policy update process is complete. As a result of this determination, the integrity verifier removes the verified checksum of the previous version of the policy data set, maintaining the verified checksum of the new version as the only checksum for comparison until another version is received.

In another example, a checksum comparison by the integrity verifier results in non-matching checksums for the first virtual machine, indicating that the policy data set of the first virtual machine has been improperly changed, potentially as the result of a malicious attack. The integrity verifier generates a checksum failure indicator and sends the indicator to both the client device and the server. Then, the integrity verifier reduces the intervals for checksum comparisons for all other virtual machines to enable rapid detection of any other compromised virtual machines.

Upon receiving the checksum failure indicator from the integrity verifier, the client device halts the operations of the first virtual machine, preventing it from doing anything else until the policy data set issue has been resolved. When the server receives the checksum failure indicator, it begins a high priority policy update process that includes sending a clean copy of the most recent version of the most recent version of the policy data set of the first virtual machine to the client device. The client device may update the first virtual machine with the clean copy of the policy data set upon resolution of the issue.

Exemplary Operating Environment

In examples that involve a hardware abstraction layer on top of a host computer (e.g., server), the hardware abstraction layer allows multiple containers to share the hardware resource. These containers, isolated from each other, have at least a user application running therein. The hardware abstraction layer thus provides benefits of resource isolation and allocation among the containers. In some examples, VMs are used alternatively or in addition to the containers, and hypervisors are used for the hardware abstraction layer. In these examples, each VM generally includes a guest operating system in which at least one application runs.

For the container examples, it should be noted that the disclosure applies to any form of container, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources may be isolated, services restricted, and processes provisioned to have a private view of the operating system with their own process ID space, file system structure, and network interfaces. Multiple containers may share the same kernel, but each container may be constrained to only use a defined amount of resources such as CPU, memory and I/O.

Figure 5:
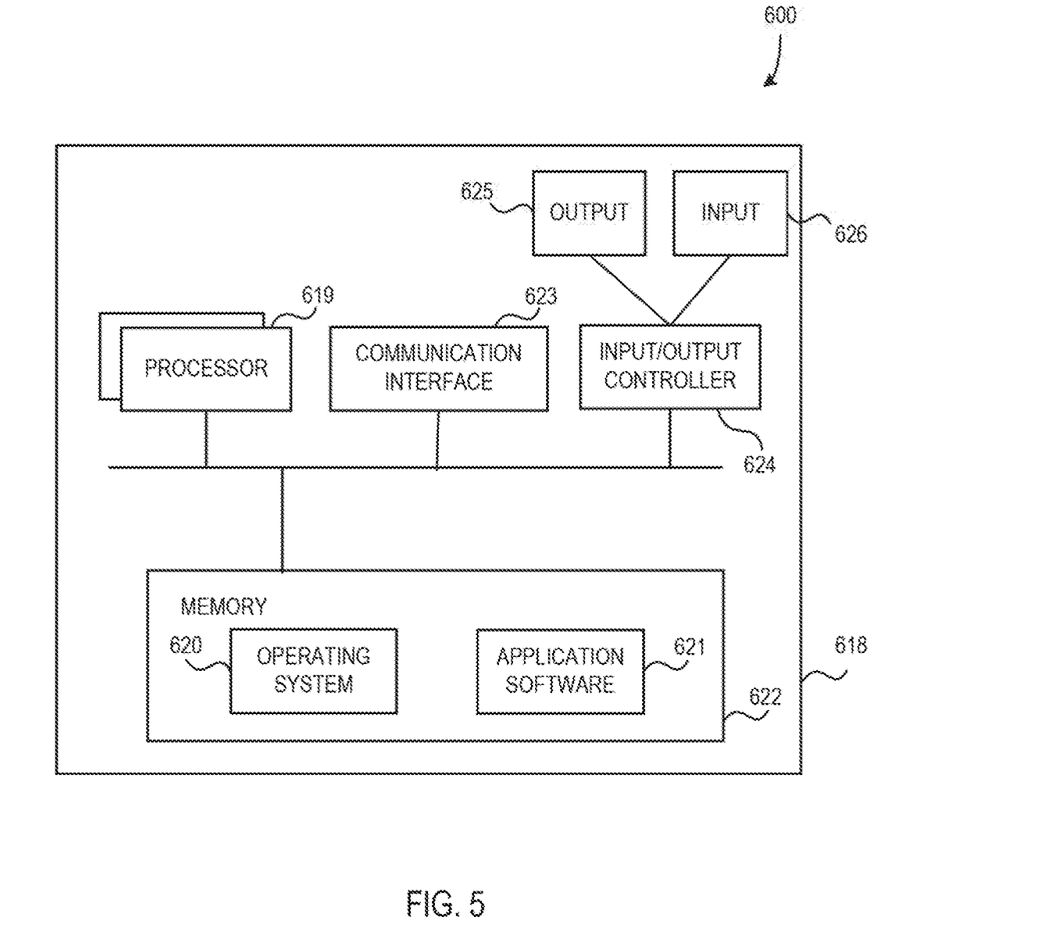
FIG. 5 illustrates a computing apparatus according to an example as a functional block diagram.

The present disclosure is operable with a computing apparatus according to an example as a functional block diagram 500 in FIG. 5. In an example, components of a computing apparatus 518 are implemented as a part of an electronic device according to one or more examples described in this specification. The computing apparatus 518 comprises one or more processors 519 which may be microprocessors, controllers or any other suitable type of processors for processing computer executable instructions to control the operation of the electronic device. Alternatively, or in addition, the processor 519 is any technology capable of executing logic or instructions, such as a hard-coded machine. Platform software comprising an operating system 520 or any other suitable platform software may be provided on the apparatus 518 to enable application software 521 to be executed on the device. According to an example, verifying the integrity of policy data of security applications of virtual machines on a client device based on comparison of generated checksums as described herein are accomplished by software, hardware, and/or firmware.

Computer executable instructions may be provided using any computer-readable media that are accessible by the computing apparatus 518. Computer-readable media may include, for example, computer storage media such as a memory 522 and communications media. Computer storage media, such as a memory 522, are non-transitory and include volatile and non-volatile, removable and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one example, the output device 525 may also act as the input device. An example of such a device may be a touch sensitive display. The input/output controller 524 may also output data to devices other than the output device, e.g. a locally connected printing device. In some examples, a user provides input to the input device(s) 526 and/or receive output from the output device(s) 525.

The functionality described herein can be performed, at least in part, by one or more hardware logic components. According to an example, the computing apparatus 518 is configured by the program code when executed by the processor 519 to execute the examples of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

A computerized method for verifying integrity of security policies on a client device comprises: receiving and storing, on the client device, at least one policy data set associated with at least one security application of at least one virtual machine on the client device from a server; receiving, by an integrity verifier on the client device, at least one verified checksum from the server, wherein the at least one verified checksum is associated with the at least one policy data set of the at least one security application; generating, by the integrity verifier, at least one client-side checksum based on the stored at least one policy data set, wherein the at least one client-side checksum corresponds to the at least one verified checksum; based on generating the at least one client-side checksum, comparing, by the integrity verifier, the at least one verified checksum to a most recently generated at least one client-side checksum; and based on the comparison indicating that the at least one verified checksum and the at least one client-side checksum differ, generating, by the integrity verifier, a checksum failure indicator, wherein the client device is configured to take corrective measures to restore integrity of the at least one virtual machine based on the checksum failure indicator.

An example computer system comprises: a processor at a client device; a non-transitory computer readable medium having stored thereon program code for verifying integrity of security policies on the client device, the program code causing the processor to: receive and store, on the client device, at least one policy data set associated with at least one security application of at least one virtual machine on the client device from a server; receive, by an integrity verifier on the client device, at least one verified checksum from the server, wherein the at least one verified checksum is associated with the at least one policy data set of the at least one security application; generate, by the integrity verifier, at least one client-side checksum based on the stored at least one policy data set, wherein the at least one client-side checksum corresponds to the at least one verified checksum; based on generating the at least one client-side checksum, compare, by the integrity verifier, the at least one verified checksum to a most recently generated at least one client-side checksum; and based on the comparison indicating that the at least one verified checksum and the at least one client-side checksum differ, generate, by the integrity verifier, a checksum failure indicator, wherein the client device is configured to take corrective measures to restore integrity of the at least one virtual machine based on the checksum failure indicator.

An exemplary non-transitory computer readable storage medium having stored thereon program code executable by a first computer system at a first site, the program code embodying a method comprises: receiving and storing, on the client device, at least one policy data set associated with at least one security application of at least one virtual machine on the client device from a server; receiving, by an integrity verifier on the client device, at least one verified checksum from the server, wherein the at least one verified checksum is associated with the at least one policy data set of the at least one security application; generating, by the integrity verifier, at least one client-side checksum based on the stored at least one policy data set, wherein the at least one client-side checksum corresponds to the at least one verified checksum; based on generating the at least one client-side checksum, comparing, by the integrity verifier, the at least one verified checksum to a most recently generated at least one client-side checksum; and based on the comparison indicating that the at least one verified checksum and the at least one client-side checksum differ, generating, by the integrity verifier, a checksum failure indicator, wherein the client device is configured to take corrective measures to restore integrity of the at least one virtual machine based on the checksum failure indicator.

Alternatively, or in addition to the other examples described herein, examples include any combination of the following:

wherein the client device includes a plurality of virtual machines, each virtual machine of the plurality of virtual machines including a security application; wherein receiving and storing the at least one policy data set includes receiving and storing a policy data set for each security application of the plurality of virtual machines; wherein the at least one verified checksum includes a verified checksum for each of the stored policy data sets; and wherein the integrity verifier is configured to generate client-side checksums for each policy data set of each security application and compare each verified checksum of each policy data set to a generated client-side checksum associated with the corresponding policy data set.

wherein corrective measures which the client device is configured to take include at least one of providing a checksum failure notification to the server, providing a checksum failure notification to a user interface, shutting down, suspending, or quarantining a virtual machine associated with the differing checksums, or adjusting an interval of the integrity verifier such that the integrity verifier compares checksums more frequently.

further comprising: based on initiation of a policy update process, receiving and storing, on the client device, at least one updated policy data set from the server; and receiving, by the integrity verifier, at least one updated checksum associated with the at least one updated policy data set from the server; wherein comparing, by the integrity verifier, the at least one verified checksum to a most recently generated at least one client-side checksum includes comparing the at least one verified checksum and the at least one updated checksum to the most recently generated at least one client-side checksum; and wherein generating, by the integrity verifier, a checksum failure indicator is further based on the comparison indicating that the at least one verified checksum and the at least one client-side checksum differ and the at least one updated checksum and the at least one client-side checksum differ, whereby the at least one security application is enabled to remain operational during asynchronous policy update processes.

wherein, based on detecting completion of the policy update process, the integrity verifier is configured to remove the at least one verified checksum such that the at least one updated checksum remains.

wherein the at least one client-side checksum is generated repeatedly based on an interval; and wherein the interval is adjusted based on at least one of a random value or pseudorandom value for each generation of the at least one client-side checksum.

wherein generating the at least one client-side checksum is based on a subset of the policy data set of the at least one policy data set.

Any range or device value given herein may be extended or altered without losing the effect sought, as will be apparent to the skilled person. While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for receiving and storing, on the client device, at least one policy data set associated with at least one security application of at least one virtual machine on the client device from a server; exemplary means for receiving, by an integrity verifier on the client device, at least one verified checksum from the server, wherein the at least one verified checksum is associated with the at least one policy data set of the at least one security application; exemplary means for generating, by the integrity verifier, at least one client-side checksum based on the stored at least one policy data set, wherein the at least one client-side checksum corresponds to the at least one verified checksum; based on generating the at least one client-side checksum, exemplary means for comparing, by the integrity verifier, the at least one verified checksum to a most recently generated at least one client-side checksum; and, based on the comparison indicating that the at least one verified checksum and the at least one client-side checksum differ, exemplary means for generating, by the integrity verifier, a checksum failure indicator, wherein the client device is configured to take corrective measures to restore integrity of the at least one virtual machine based on the checksum failure indicator.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computerized method for verifying integrity of security policies on a client device, the method comprising:
   receiving and storing, on the client device, at least one policy data set associated with at least one security application of at least one virtual computing instance (VCI) on the client device from a server;
   receiving, by the integrity verifier on the client device, at least one verified checksum from the server, wherein the at least one verified checksum is associated with the at least one policy data set of the at least one security application, wherein the integrity verifier uses memory of the client device that is protected from access by the at least one VCI to store the at least one verified checksum,
   generating, by the integrity verifier, at least one client-side checksum based on the stored at least one policy data set, wherein the at least one client-side checksum is generated using the memory protected from access by the at least one VCI and the generated at least one client-side checksum is stored in the memory protected from access by the at least one VCI;
   comparing, by the integrity verifier, the at least one verified checksum to the generated at least one client-side checksum; and
   based on the comparison indicating that the at least one verified checksum and the generated at least one client-side checksum differ, generating, by the integrity verifier, a checksum failure indicator wherein the client device is configured to take corrective measures to restore integrity of the at least one VCI based on the checksum failure indicator.

2. The computerized method of claim 1, wherein the client device includes a plurality of VCIs, each VCI of the plurality of VCIs is including a security application;
   wherein receiving and storing the at least one policy data set includes receiving and storing a policy data set for each security application of the plurality of VCIs;
   wherein the at least on verified checksum includes a verified checksum for each of the stored policy data sets; and
   wherein the integrity verifier is configured to generate client-side Checksums for each policy data set of each security application and compare each verified checksum of each policy data set to a generated client-side checksum associated with the corresponding policy data set.

3. The computerized method of claim 2, wherein corrective measures which the client device is configured to take include one or more of the following: providing a checksum failure notification to the server, providing a checksum failure notification to a user interface, shutting down, suspending, or quarantining a VCI associated with the differing checksums, and adjusting an interval of the integrity verifier such that the integrity verifier compares checksums more frequently.

4. The computerized method of claim 1, the method further comprising:
   based on initiation of a policy update process, receiving and storing, on the client device, at least one updated policy data set from the server; and
   receiving, by the integrity verifier, at least one updated checksum associated with the at least one updated policy data set from the server;
   wherein comparing, by the integrity verifier, the at least one verified checksum to the generated at least one client-side checksum includes comparing the at least one verified checksum and the at least one updated checksum to the generated at least one client-side checksum; and
   wherein generating, by the integrity verifier, a checksum failure indicator is further based on the comparison indicating that the at least one verified checksum and the at least on client-side checksum differ and the at least one updated checksum and the at least one client-side checksum differ, whereby the at least one security application is enabled to remain operational during asynchronous policy update process.

5. The computerized method of claim 4, wherein, based on detecting completion of the policy update process, the integrity verifier is configured to remove the at least one verified checksum such that the at least one updated checksum remains.

6. The computerized method of claim 1, wherein the at least one client-side checksum is generated, and the generated client-side checksum is compared to the verified checksum repeatedly based on an interval, whereby integrity of the at least one policy data set is monitored during operation of the at least one VCI on the client device; and
   wherein the interval is adjusted based on at least one of a random value or pseudorandom value for each generation of the at least one client-side checksum.

7. The computerized method of claim 1, wherein generating the at least one client-side checksum is based on a subset of the at least one policy data set.

8. A computer system comprising:
   a processor at a client device;
   a non-transitory computer readable medium having stored thereon program code for verifying integrity of security policies on the client device, the program code causing the processor to:
   receive and store, on the client device, at least one policy data set associated with at least one security application of at least one virtual computing instance (VCI) on the client device from a server;
   receive, by the integrity verifier on the client device, at least one verified checksum from the server, wherein the at least one verified checksum is associated with the at least one policy data set of the at least one security application, wherein the integrity verifier uses memory of the client device that is protected from access by the at least one VCI to store the at least one verified checksum;
   generate, by the integrity verifier, at least one client-side checksum based on the stored at least one policy data set, wherein the at least one client-side checksum is generated using the memory protected from access by the at least one VCI and the generated at least one client-side checksum is stored in the memory protected from access by the at least one VCI;

compare, by the integrity verifier, the at least one verified checksum to the generated at least one client-side checksum; and based on the comparison indicating that the at least one verified checksum and the generated at least one client-side checksum differ, generate, by the integrity verifier, a checksum failure indicator, wherein the client device is configured to take corrective measures to restore integrity of the at least one VCI based on the checksum failure indicator.

9. The system of claim 8, wherein the client device includes a plurality of VCIs, each VCI of the plurality of VCIs including a security application;

wherein receiving and storing the at least one policy data set includes receiving and storing a policy data set for each security application of the plurality of VCIs;

wherein the at least one verified checksum includes a verified checksum for each of the stored policy data sets; and wherein the integrity verifier is configured to generate client-side checksums for each policy data set of each security application and compare each verified checksum for each policy data set to a generated client-side checksum associated with the corresponding policy data set.

10. The system of claim 9, wherein corrective measures which the client device is configured to take include one or more of the following: providing a checksum failure notification to the server, providing a checksum failure notification to a user interface, shutting down, suspending, or quarantining a VCI associated with the differing checksums, and adjusting an interval of the integrity verifier such that the integrity verifier compares checksums more frequently.

11. The system of claim 8, the program code further causing the processor to:

based on initiation of a policy update process, receive and store, on the client device, at least one updated policy data set from the server; and receive, by the integrity verifier, at least one updated checksum associated with the at least one updated policy data set from the server;

wherein comparing, by the integrity verifier, the at least one verified checksum to the generated at least one client-side checksum includes comparing the at least one verified checksum and the at least one updated checksum to the generated at least one client-side checksum; and wherein generating, by the integrity verifier, a checksum failure indicator is further based on the comparison indicating that the at least one verified checksum and the at least on client-side checksum differ and the at least one updated checksum and the at least one client-side checksum differ, whereby the at least one security application is enabled to remain operational during asynchronous policy update processes.

12. The system of claim 11, wherein, based on detecting completion of the policy update process, the integrity verifier is configured to remove the at least one verified checksum such that the at least one updated checksum remains.

13. The system of claim 8, Wherein the at least one client-side checksum is generated, and the generated client-side checksum is compared to the verified checksum repeatedly based on an interval, whereby integrity of the at least one policy data set is monitored during operation of the at least one VCI on the client device; and wherein the interval is adjusted based on at least one of a random value or pseudorandom value for each generation of the at least one client-side checksum.

14. The system of claim 8, wherein generating the at least one client-side checksum is based on a subset of the at least one policy data set.

15. A non-transitory computer readable storage medium having stored thereon program code executable by a first computer system at a first site, the program code embodying a method comprising:

receiving and storing, on the client device, at least one policy data set associated with at least one security application of at least one virtual computing instance (VCI) on the client device from a server;

receiving, by the integrity verifier on the client device, at least one verified checksum from the server, wherein the at least one verified checksum is associated with the at least one policy data set of the at least one security application, wherein the integrity verifier uses memory of the client device that is protected from the at least one VCI to store the at least one verified checksum;

generating, by the integrity verifier, at least one client-side checksum based on the stored at least one policy data set, wherein the at least one client-side checksum is generated using the memory protected from the at least one VCI and the generated at least one client-side checksum is stored in the memory protected from the at least one VCI;

comparing, by the integrity verifier, the at least one verified checksum to the generated at least one client-side checksum; and based on the comparison indicating that the at least one verified checksum and the generated at least one client-side checksum differ, generating, by the integrity verifier, a checksum failure indicator, wherein the client device is configured to take corrective measures to restore integrity of the at least one VCI based on the checksum failure indicator.

16. The non-transitory computer readable storage medium of claim 15, wherein the client device includes a plurality of VCIs, each VCI of the plurality of VCIs is including a security application;

wherein receiving and storing the at least one policy data set includes receiving and storing a policy data set for each security application of the plurality of VCIs;

Wherein the at least on verified checksum includes a verified checksum for each of the stored policy data sets; and wherein the integrity verifier is configured to generate client-side checksums for each policy data set of each security application and compare each verified checksum of each policy data set to a generated client-side checksum associated with the corresponding policy data set.

17. The non-transitory computer readable storage medium of claim 16, wherein corrective measures which the client device is configured to take include one or more of the following: providing a checksum failure notification to the server, providing a checksum notification to a user interface, shutting down, suspending, or quarantining a VCI associated with the differing checksums, and adjusting an interval of the integrity verifier such that the integrity verifier compares checksums more frequently.

18. The non-transitory computer readable storage medium of claim 15, the method further comprising:

based on initiation of a policy update process, receiving and storing, the client device, at least one updated policy data set from the server; and receiving, by the integrity verifier, at least one updated checksum associated with the at least one updated policy data set from the server;

wherein comparing, by the integrity verifier, the at least one verified checksum to the generated at least one client-side checksum includes comparing the at least one verified checksum and the at least one updated checksum to the generated at least one client-side checksum; and wherein generating, by the integrity verifier, a checksum failure indicator is further based on the comparison indicating that the at least one verified checksum and the at least on client-side checksum differ and the at least one updated checksum and the at least one client-side checksum differ, whereby the at least one security application is enabled to remain operational during asynchronous policy update processes.

19. The non-transitory computer readable storage medium of claim 18, wherein based on detecting completion of the policy update process, the integrity verifier is configured to remove the at least one verified checksum such that the at least one updated checksum remains.

20. The non-transitory computer readable storage medium of claim 15, wherein the at least one client-side checksum is generated, and the generated, client-side checksum is compared to the verified checksum repeatedly based on an interval, whereby integrity of the at least one policy data set is monitored during operation of the at least one VCI on the client device; and wherein the interval is adjusted based on at least one of a random value or pseudorandom value for each generation of the at least one client-side checksum.

* * * * *